United States Patent
Versteeg

[11] 3,823,999
[45] July 16, 1974

[54] MAGNIFIER

[75] Inventor: Frits Johan Versteeg, Rotterdam, Netherlands

[73] Assignee: N. V. Optische Industrie, de Oude Delft, Delft, Netherlands

[22] Filed: Dec. 8, 1972

[21] Appl. No.: 313,331

[30] Foreign Application Priority Data
Jan. 14, 1972 Netherlands........................ 7200567

[52] U.S. Cl.............. 350/216, 350/175 E, 350/176
[51] Int. Cl. ............................................ G02b 25/04
[58] Field of Search ................ 350/175 E, 216, 220

[56] References Cited
UNITED STATES PATENTS
| | | | |
|---|---|---|---|
| 3,233,513 | 2/1966 | Wagner et al. | 350/220 |
| 3,612,662 | 10/1971 | Sissel | 350/175 E |
| 3,658,412 | 4/1972 | Seaman | 350/220 |

*Primary Examiner*—John K. Corbin
*Attorney, Agent, or Firm*—Arthur B. Colvin

[57] ABSTRACT

A magnifier for relative apertures exceeding $f/1$, an angular field larger than $2 \times 25°$ and a pupil distance larger than 0.9 for viewing the anode screen of an image intensifier tube, which forms part of a viewing device, which is mounted in a vehicle.

3 Claims, 8 Drawing Figures

MAGNIFIER

The invention relates to a magnifier with a relative aperture exceeding $f/1$, an angular field larger than $2 \times 15°$, a pupil distance larger than $0.9f$, made up of the following components;

A first component made up of a positive front lens having the form of a meniscus;

A second component made up of a single positive lens;

A third component made up of a single positive lens;

A fourth component made up of a lens having the form of a meniscus with a cemented surface, the concave surface of which being placed in the direction of the eye.

A magnifier built in accordance with the above conditions is known from German Auslegeschrift Pat. No. 1,237,355. A magnifier of this type is used for instance in viewing of the anode screen of an image intensifier tube, which forms part of a viewing device, which is mounted in a vehicle.

Under these circumstances it is an advantage to have a pupil distance as large as possible in order to avoid that the viewer knocks his head against the device when the vehicle moves in a rough terrain or on a bumpy road, or that an object of interest in the terrain disappears from his field of view. It appears, that the magnifier in accordance with the German Auslegeschrift, having a pupil distance up to $0.85f$ and a last component with a concave surface which is turned to the eye, does not satisfy the requirements mentioned above under all circumstances.

The object of the invention is to provide a magnifier of the above mentioned type with a relative aperture of at least $f/1$, a pupil distance of at least $0.9f$ and an angular field of at least $2 \times 25°$, and a good state of correction.

A magnifier according to the invention is characterized in that a fifth component having the form of a positive lens is placed behind the fourth component, the sum of the powers of the two surfaces of the fifth component having a value between $0.35/f$ and $0.55/f$, the power of the rearmost surface of the fourth component having a value between $0.63/f$ and $1.03/f$, and the power of the front surface of the fourth component having a value between $0.51/f$ and $0.63/f$.

Figure 1:
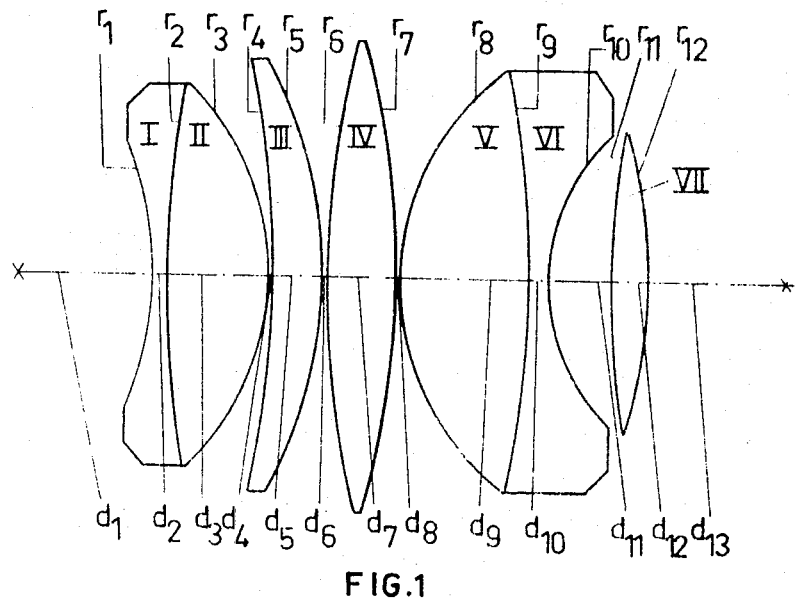
FIG. 1 shows an embodiment of the magnifier in accordance with the invention.

The magnifier shown in FIG. 1 has a pupil distance of $1.35f$ and is characterized by the following data, the lenses of the magnifier I–VII starting from the front lens being indicated in the first column, the refractive indices $n_I$–$n_{VII}$ of the glasses of the successive lenses being indicated in the second column, the Abbe numbers $\nu_I$–$\nu_{VII}$ of the glasses of the successive lenses being indicated in the third column, the successive axial thicknesses and separations in air $d_1$–$d_{13}$ being indicated in the fourth column, the radii of curvature of the successive refractive surfaces $r_1$–$r_{12}$ being indicated in the fifth column and the power $\Delta n/r$ of the successive refractive surfaces being indicated in the sixth column.

TABLE I

| $f=1$ | | | | $f/0.7$ | $2\omega=2\times 30°$ |
|---|---|---|---|---|---|
| I | 1.7919 | 25.8 | $d_1=0.3201$ | $r_1=-1.7541$ | $-0.4515$ |
| | | | $d_2=0.0738$ | $r_2=+9.3903$ | $-0.0081$ |
| II | 1.71616 | 53.8 | $d_3=0.5109$ | $r_3=-1.2965$ | $+0.5524$ |
| | | | $d_4=0.0057$ | $r_4=-6.7268$ | $-0.1065$ |
| III | 1.71616 | 53.8 | $d_5=0.2780$ | $r_5=-2.1020$ | $+0.3407$ |
| | | | $d_6=0.0057$ | $r_6=+5.7902$ | $+0.1237$ |
| IV | 1.71616 | 53.8 | $d_7=0.3520$ | $r_7=-4.2921$ | $+0.1669$ |
| | | | $d_8=0.0057$ | $r_8=+1.3100$ | $+0.5710$ |
| V | 1.74795 | 44.8 | $d_9=0.6812$ | $r_9=-6.8029$ | $-0.0095$ |
| VI | 1.81265 | 25.4 | $d_{10}=0.0908$ | $r_{10}=+0.9826$ | $-0.8270$ |
| | | | $d_{11}=0.3122$ | $r_{11}=+4.8160$ | $+0.1553$ |
| VII | 1.74795 | 44.8 | $d_{12}=0.2214$ | $r_{12}=-2.6137$ | $+0.2862$ |
| pupil distance = | | | $d_{13}=1.1350$ | | |

Figure 2:
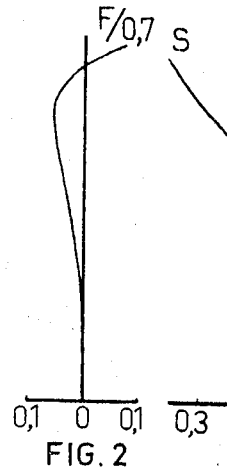
FIGS. 2–4 show aberration curves of the magnifier shown in FIG. 1.
Figures 3, 4:
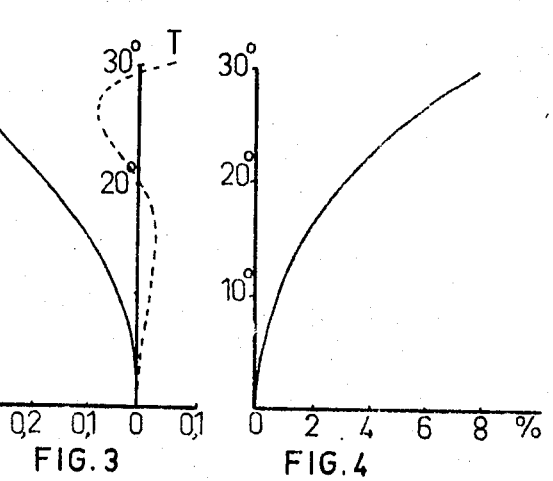

From the aberration curves, shown in FIGS. 2–4, for the spherical lateral aberration, the astigmatism and the distortion respectively it is seen that this magnifier has a good state of correction in an angular field of $2 \times 30°$, the pupil distance of $1.135f$ leading to a magnification of 14 times by a real pupil distance of 20 mm.

Figure 5:
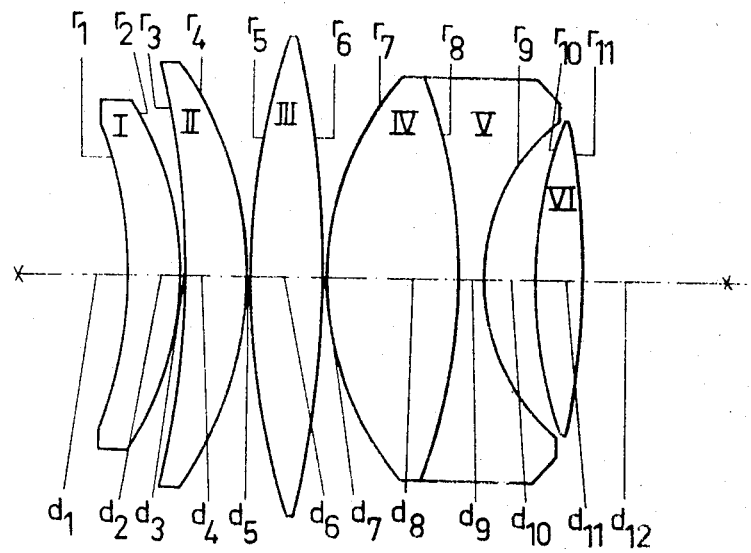
FIG. 5 shows another embodiment of the magnifier according to the invention.

The magnifier as shown in FIG. 5 has a pupil distance of $1.0400f$ and is characterized by the following data, the lenses of the magnifier I–VI starting from the front lens being indicated in the first column, the refractive indices $n_I$–$n_{VI}$ of the glasses of the successive lenses being indicated in the second column, the Abbe numbers $\nu_I$–$\nu_{VI}$ of the glasses of the successive lenses being indicated in the third column, the successive axial thicknesses and separations in air $d_1$–$d_{12}$ being indicated in the fourth column, the radii of curvature of the successive refractive surfaces $r_1$–$r_{11}$ being indicated in the fifth column and the power $\Delta n/r$ of the successive refractive surfaces being indicated in the sixth column.

the powers of the two surfaces of the fifth component having a value between $0.35/f$ and $0.55/f$, the power of

TABLE II

| $f=1$ | | | | $f/0.7$ | $2\omega=2\times30°$ |
|---|---|---|---|---|---|
| | | | $d_1=0.4982$ | | |
| I | 1.74795 | 44.8 | $d_2=0.3278$ | $r_1=-2.1522$ | $-0.3475$ |
| | | | $d_3=0.0048$ | $r_2=-1.6198$ | $+0.4618$ |
| II | 1.74795 | 44.8 | $d_4=0.3918$ | $r_3=-7.4036$ | $-0.1010$ |
| | | | $d_5=0.0080$ | $r_4=-1.8597$ | $+0.4022$ |
| III | 1.71616 | 53.8 | $d_6=0.3997$ | $r_5=+4.3053$ | $+0.1663$ |
| | | | $d_7=0.0080$ | $r_6=-5.2415$ | $+0.1366$ |
| IV | 1.73688 | 51.7 | $d_8=0.8686$ | $r_7=+1.4263$ | $+0.5166$ |
| V | 1.7919 | 25.8 | $d_9=0.1359$ | $r_8=-3.2318$ | $-0.0170$ |
| | | | $d_{10}=0.2478$ | $r_9=+0.9538$ | $-0.8303$ |
| VI | 1.71616 | 53.8 | $d_{11}=0.2718$ | $r_{10}=+2.3413$ | $+0.3059$ |
| pupil distance = | | | $d_{12}=1.0400$ | $r_{11}=-4.7218$ | $+0.1517$ |

Figures 6, 7, 8:
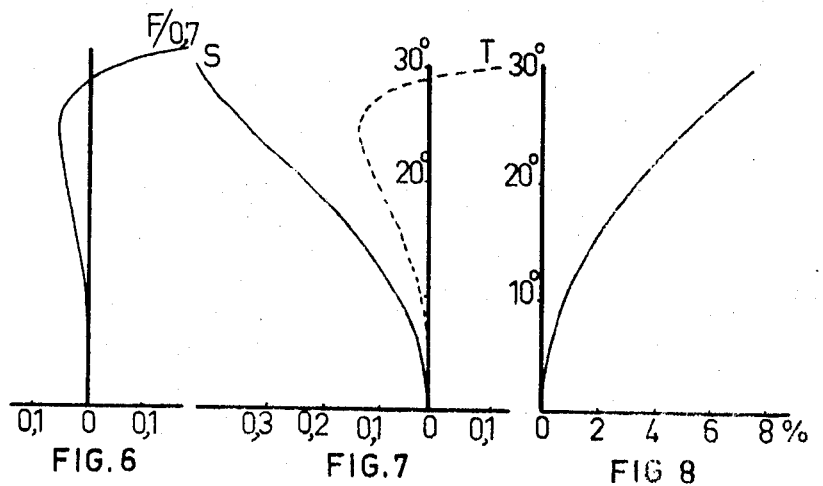
FIGS. 6–8 show aberration curves of the magnifier shown in FIG. 5.

From the aberration curves, shown in FIGS. 6–8, for the spherical lateral aberration, the astigmatism and the distortion respectively it is seen that this magnifier has a good state of correction in an angular field of 2 × 30°, the pupil distance being $1.04f$.

What I claim is:

1. Magnifier with a relative aperture exceeding $f/1$, an angular field larger than 2 × 25°, a pupil distance larger than $0.9f$, consisting of the following components, a first component made up of a positive front lens having the form of a meniscus, a second component made up of a single positive lens, a third component made up of a single positive lens, a fourth component made up of a lens having the form of a meniscus with a cemented surface, the concave surface of which being placed in the direction of the eye, characterized in that a fifth component having the form of a positive lens is placed behind the fourth component, the sum of the powers of the two surfaces of the fifth component having a value between $0.35/f$ and $0.55/f$, the power of the rearmost surface of the fourth component having a value between $0.63/f$ and $1.03/f$, and the power of the front surface of the fourth component having a value between $0.51/f$ and $0.63/f$.

2. Magnifier according to claim 1, characterized by the following numeral data, the lenses of the magnifier I–VII starting from the front lens being indicated in the first column, the refractive indices $n_I-n_{VII}$ of the glasses of the successive lenses being indicated in the second column, the Abbe numbers $\nu_I-\nu_{VII}$ of the glasses of the successive lenses being indicated in the third column, the successive axial thicknesses and separations in air $d_1-d_{12}$ being indicated in the fourth column, the radii of curvature of the successive refractive surfaces $r_1-r_{12}$ being indicated in the fifth column and the power $\Delta n/r$ of the successive refractive surfaces being indicated in the sixth column.

| $f=1$ | | | | $f/0.7$ | $2\omega=2\times30°$ |
|---|---|---|---|---|---|
| | | | $d_1=0.3201$ | | |
| I | 1.7919 | 25.8 | $d_2=0.0738$ | $r_1=-1.7541$ | $-0.4515$ |
| II | 1.71616 | 53.8 | $d_3=0.5109$ | $r_2=+9.3903$ | $-0.0081$ |
| | | | $d_4=0.0057$ | $r_3=-1.2965$ | $+0.5524$ |
| III | 1.71616 | 53.8 | $d_5=0.2780$ | $r_4=-6.7268$ | $-0.1065$ |
| | | | $d_6=0.0057$ | $r_5=-2.1020$ | $+0.3407$ |
| IV | 1.71616 | 53.8 | $d_7=0.3520$ | $r_6=+5.7902$ | $+0.1237$ |
| | | | $d_8=0.0057$ | $r_7=-4.2921$ | $+0.1669$ |
| V | 1.74795 | 44.8 | $d_9=0.6812$ | $r_8=+1.3100$ | $+0.5710$ |
| VI | 1.81265 | 25.4 | $d_{10}=0.0908$ | $r_9=-6.8029$ | $-0.0095$ |
| | | | $d_{11}=0.3122$ | $r_{10}=+0.9826$ | $-0.8270$ |
| VII | 1.74795 | 44.8 | $d_{12}=0.2214$ | $r_{11}=+4.8160$ | $+0.1553$ |
| pupil distance = | | | $d_{13}=1.1350$ | $r_{12}=-2.6137$ | $+0.2862$ |

3. Magnifier according to claim 1, characterized by the following numeral data, the lenses of the magnifier I–VI starting from the front lens being indicated in the first column, the refractive indices $n_I$–$n_{VI}$ of the glasses of the successive lenses being indicated in the second column, the Abbe numbers $\nu_I$–$\nu_{VI}$ of the glasses of the successive lenses being indicated in the third column, the successive axial thicknesses and separations in air $d_1$–$d_{12}$ being indicated in the fourth column, the radii of curvature of the successive refractive surfaces $r_1$–$r_{11}$ being indicated in the fifth column and the power $\Delta n/r$ of the successive refractive surfaces being indicated in the sixth column,

| $f=1$ | | | | $f/0.7$ | $2\Omega = 2\times 30°$ |
|---|---|---|---|---|---|
| | | | $d_1=0.4982$ | | |
| I | 1.74795 | 44.8 | $d_2=0.3278$ | $r_1=-2.1522$ | $-0.3475$ |
| | | | | $r_2=-1.6198$ | $+0.4618$ |
| | | | $d_3=0.0048$ | $r_3=-7.4036$ | $-0.1010$ |
| II | 1.74795 | 44.8 | $d_4=0.3918$ | | |
| | | | $d_5=0.0080$ | $r_4=-1.8597$ | $+0.4022$ |
| | | | | $r_5=+4.3053$ | $+0.1663$ |
| III | 1.71616 | 53.8 | $d_6=0.3997$ | | |
| | | | $d_7=0.0080$ | $r_6=-5.2415$ | $+0.1366$ |
| IV | 1.73688 | 51.7 | $d_8=0.8686$ | $r_7=+1.4263$ | $+0.5166$ |
| V | 1.7919 | 25.8 | $d_9=0.1359$ | $r_8=-3.2318$ | $-0.0170$ |
| | | | $d_{10}=0.2478$ | $r_9=+0.9538$ | $-0.8303$ |
| VI | 1.71616 | 53.8 | $d_{11}=0.2718$ | $r_{10}=+2.3413$ | $+0.3059$ |
| pupil distance = | | | $d_{12}=1.0400$ | $r_{11}=-4.7218$ | $+0.1517$ |

* * * * *